US012341254B2

(12) United States Patent
Chou et al.

(10) Patent No.: US 12,341,254 B2
(45) Date of Patent: Jun. 24, 2025

(54) INTEGRATED ANTENNA DEVICE

(71) Applicant: NATIONAL TAIWAN UNIVERSITY, Taipei (TW)

(72) Inventors: Hsi-Tseng Chou, Taipei (TW); Chih-Ta Yen, Taipei (TW); Qian-Xin An, Taipei (TW); Wei-Feng Chen, Taipei (TW); Cheng-Liang Shih, Taipei (TW)

(73) Assignee: National Taiwan University, Taipei (TW)

( * ) Notice: Subject to any disclaimer, the term of this patent is extended or adjusted under 35 U.S.C. 154(b) by 301 days.

(21) Appl. No.: 17/965,286

(22) Filed: Oct. 13, 2022

(65) Prior Publication Data

US 2024/0022007 A1 Jan. 18, 2024

(30) Foreign Application Priority Data

Jul. 12, 2022 (TW) ................................. 111126130

(51) Int. Cl.
*H01Q 21/20* (2006.01)
*H01Q 3/34* (2006.01)

(52) U.S. Cl.
CPC ............... *H01Q 21/20* (2013.01); *H01Q 3/34* (2013.01)

(58) Field of Classification Search
CPC ........ H01Q 21/20; H01Q 21/065; H01Q 3/34; H01Q 3/245; H01Q 15/0086; H01Q 15/06; H01Q 15/10; H01Q 19/062
See application file for complete search history.

(56) References Cited

U.S. PATENT DOCUMENTS 5,933,120 A * 8/1999 Manasson .............. H01Q 13/28 343/788
6,320,553 B1 11/2001 Ergene
(Continued)

FOREIGN PATENT DOCUMENTS

CN 108701905 B 12/2020

OTHER PUBLICATIONS

Hsi-Tseng, et. al, "Synthesis of Microstrip Antenna Arrays for Optimum Near-Field Patterns via Steepest Decent Method", IEEE International Symposium on Antennas and Propagation (Year: 2011).*
(Continued)

*Primary Examiner* — Seokjin Kim
(74) *Attorney, Agent, or Firm* — Rosenberg, Klein & Lee

(57) ABSTRACT

An integrated antenna device comprises a curved-surface transmitting array and an array antenna. The curved-surface transmitting army has a plurality of focuses to homogenize its radiation gains. The array antenna is arranged between the curved-surface transmitting array and the plurality of focuses. According to the control of an active RF module of the array antenna, the array antenna emits the first-order beam and performs beam scanning. The curved-surface transmitting array is used to focus the first-order beam to produce a second-order beam with high gain. The generation of the beamforming feed excitation weight of the active RF module makes the integrated antenna device have a beam scanning mechanism. The array antenna can be formed by feeder antennas A DSP dynamic groups the feeder antennas to form subarrays, the subarrays can generate different first-order beams for multi-point communications. The first-order beams can be scanned in an interleaved fashion.

10 Claims, 8 Drawing Sheets

(56) References Cited

U.S. PATENT DOCUMENTS

| | | | | |
|---|---|---|---|---|
| 10,116,058 | B2 * | 10/2018 | Oh | H01Q 19/062 |
| 10,931,029 | B2 * | 2/2021 | Ko | H04B 7/0617 |
| 2005/0052333 | A1 | 3/2005 | Rao et al. | |
| 2008/0165079 | A1 * | 7/2008 | Smith | B82Y 20/00 343/911 R |
| 2015/0236416 | A1 | 8/2015 | Fonseca | |
| 2016/0240923 | A1 * | 8/2016 | Oh | H01Q 21/061 |
| 2018/0081049 | A1 * | 3/2018 | Christie | H01Q 25/008 |
| 2018/0269576 | A1 * | 9/2018 | Scarborough | H01Q 21/0025 |
| 2019/0319363 | A1 * | 10/2019 | Ko | H01Q 21/0031 |
| 2020/0212588 | A1 * | 7/2020 | Rofougaran | H01Q 1/36 |
| 2021/0384639 | A1 * | 12/2021 | Rofougaran | H01Q 19/062 |
| 2023/0246345 | A1 * | 8/2023 | Turpin | H01Q 21/065 343/702 |
| 2023/0299500 | A1 * | 9/2023 | Rofougaran | H01Q 21/0006 343/753 |
| 2023/0299501 | A1 * | 9/2023 | Rofougaran | H01Q 15/02 343/753 |
| 2024/0079776 | A1 * | 3/2024 | Scarborough | H01Q 3/46 |

OTHER PUBLICATIONS

Chou, Hsi-Tseng, Kuo-Lung Hung, and Hsi-Hsir Chou. "Synthesis of microstrip antenna arrays for optimum near-field patterns via steepest decent method." 2011 IEEE International Symposium on Antennas and Propagation (APSURSI). IEEE, 2011.

Chou, Hsi-Tseng, and Danai Torrungrueng. "Development of 2-D generalized tri-focal Rotman lens beamforming network to excite conformal phased arrays of antennas for general near/far-field multi-beam radiations." IEEE Access 9 (2021): 49176-49188.

Zaghloul, Amir I., and Steven J. Weiss. "Metamaterial-driven lens optics for new beam forming patterns." Radar Sensor Technology XV. vol. 8021. SPIE, 2011.

Extended European Search Report for Counterpart Patent Application No. 22203366.4-1205 dated Jun. 12, 2023.

Office Action mailed to Corresponding Taiwanese Patent Application No. 111126130 on Jul. 27, 2023.

* cited by examiner

INTEGRATED ANTENNA DEVICE

This application claims priority of Application No. 111126130 filed in Taiwan on 12 Jul. 2022 under 35 U.S.C. § 119; the entire contents of all of which are hereby incorporated by reference.

BACKGROUND OF THE INVENTION

Field of the Invention

The present invention relates to an integrated antenna device having high gain and able to achieve multi-beam scanning of an active array antenna, particularly to an integrated antenna device, which utilizes the multifocal focusing feature of a transmission array to obtain multi-beams having almost the same gain in beam scanning, and which can decrease the units of an active army antenna, and produce multiple scannable beams simultaneously.

DESCRIPTION OF THE PRIOR ART

FIG. 1 shows a conventional antenna device 10. The antenna device 10 is a transmitting antenna device, including a transmitting array 12 and a feeder antenna 14. The feeder antenna 14 is positioned at the focus 122 of the transmitting array 12, where the phases of the allay units in the transmitting array 12 are adjusted to focus the beam in a particular direction. The transmitting array 12 may be realized by a plurality of circuit layers or a waveguide structure plate. The transmitting array 12 has a plurality of periodically-arranged array units (not shown in the drawing) for focusing the signal (or electromagnetic radiation) 142 emitted from the feeder antenna 14. The plurality of array units generates different transmitting phases according to the shapes, structures and/or sizes thereof. Through different transmitting phases, the array units focus the signal 142 to generate a high-gain beam 142' along a selected direction, which is transmitted to a far-end receiver device (such as a low earth orbit (LEO) satellite). While the receiver device moves, the feeder antenna 12 must move also to vary the direction of the beam 142' so that the beam 142' can be pointed to the receiver device, as shown by the dashed line in FIG. 1. The operation of varying the direction of the beam is called "beam scanning". The conventional transmitting array 12 has only a focus 122. While the feeder antenna 14 is not at the focus 122, the focusing ability of the transmitting array 12 is reduced. Thus, the gain of the beam 142' is lowered, and the communication quality is degraded. Such a phenomenon of gain attenuation is called "scanning loss". Therefore, in the conventional antenna device 10, the signal feeding element, such as the feeder antenna 14, must be positioned at the focus 122 of the transmitting array 12 lest the communication quality be degraded. Besides, the design of the conventional array units needs more complicated equations, which leads to a higher design difficulty.

FIG. 2 shows another conventional antenna device, which is an array antenna 20. The array antenna 20 has a plurality of feeder antennas 22 in parallel. The feeder antennas 20 may be patch antennas. The array antenna 20 controls the coefficients of the feeder antennas 22 to form a beam 24 and control the direction of beam 24. The coefficients of the feeder antennas 22 include the phases and intensities of the signals emitted by the feeder antennas 22. If it is intended to generate a high-gain beam 24, the size of the array antenna 20 must be enlarged to accommodate more feeder antennas 22. Because the feeder antennas 22 are active elements, increasing the number of feeder antennas 22 would significantly raise the cost. Besides, the power consumption also rises with the increase of feeder antennas 22. This also increases the heat generated by the array antenna 20. Then, the performance of the active transceiver module (not shown in the drawing) of the array antenna 20 would be degraded by high temperatures. Further, the control system also becomes more complicated with the increase of the feeder antennas 22. This increases the time for beam scanning of the array antenna 20, degrades the performance of the array antenna 20, and lowers the capacity of the array antenna 20.

SUMMARY OF THE INVENTION

One objective of the present invention is to provide an integrated antenna device having high gain and able to perform beam scanning, wherein the integrated antenna device achieves high gain with fewer antennas and reduces the scanning loss.

One objective of the present invention is to provide an integrated antenna device to produce multiple beams scanning simultaneously in different directions.

One objective of the present invention is to provide an integrated antenna device for multiple LEO satellite tracking.

According to one embodiment, the integrated antenna device of the present invention comprises a curved-surface transmitting array and a feeder array antenna. The curved-surface transmitting array has a plurality of focuses for feeding to homogenize the radiation gain thereof. The feeder array antenna is arranged between the curved-surface transmitting array and the plurality of focuses, which can be partitioned into several subarrays with each subarray excited by a plurality of beamforming networks (BFNs). Each BFN can be excited by a plurality of active RF modules and has a single port to the converted to an intermediate frequency (IF) band to be handled by a DSP (Digital signal processing) processor. Through the DSP coordinative computations, the subways can be operated into a standing-along group by combining the DSP computations of all subarrays or be operated by combining some adjacent subarrays to produce multi-beams pointing to different directions through the curved-surface transmitting arrays. The active RF module of the feeder array antenna (or each grouping of several subarrays) controls the feeder array antenna to emit a first-order beams and controls the directions of the first-order beams. The curved-surface transmitting array is used to focus the first-order beams to generate second-order beams with high gain. The rearranging of the beamforming feed excitation weight of the active RF module matches with the refocusing of the plurality of focuses to make the whole integrated antenna device have a beam scanning mechanism. The refocusing feature of the curved-surface transmitting array may enhance the gain of a wide-angle scanning beam and reduce scanning loss. The curved-surface transmitting array has a plurality of array units of various signal phases and determines the gain of the second-order beam. When the grouping of subarrays is employed, multi-beams are produced. The curved-surface transmitting array's plurality of array units may enhance the multiple beams simultaneously.

The integrated antenna device of the present invention uses the feeder array antenna to generate the first-order beam and implement beam scanning and then uses the curved-surface transmitting array to focus the first-order beam and generate the high-gain second-order beam. When the feeder array antenna is partitioned into subarrays processed by different DSP processors, the grouping of different subarrays may produce different beams, where the curved-surface transmitting array can focus the first-order beams and generate the high-gain second-order beams.

Therefore, it is unnecessary to increase the size of the feeder array antenna to accommodate more feeder antennas to enhance the gain of the beam because the curved transmitting array can enhance the radiation gains. Therefore, the present invention can decrease cost and reduce power consumption, and can perform multi-beam steering in interleaved directions. From a backward viewpoint, for a given gain of antenna scanning, the feeder array antenna of the present invention can maintain almost the same antenna gain and beam width using much fewer array units than the conventional array antenna. When the beam direction changes, the portion of the feeder array antenna moves to a different focus point area. Thus, the rest of the feeder array antenna at other focus points can be used to produce other beams. By alternatively changing the portions of feeder array antenna, multi-beams can be produced and scanned alternatively to differently directions.

Because the curved-surface transmitting array has a plurality of focuses, the second-order beams of different directions may have almost the same gain during beam scanning. Therefore, the present invention can decrease scanning loss or even enhance the gain of wide-angle beams to achieve a longer transmitting distance. Multiple beams can be produced simultaneously, which can be scanned simultaneously in a coordinative fashion to track different directions, such as tracking different LEO satellites.

DETAILED DESCRIPTION OF THE INVENTION

Figure 1:
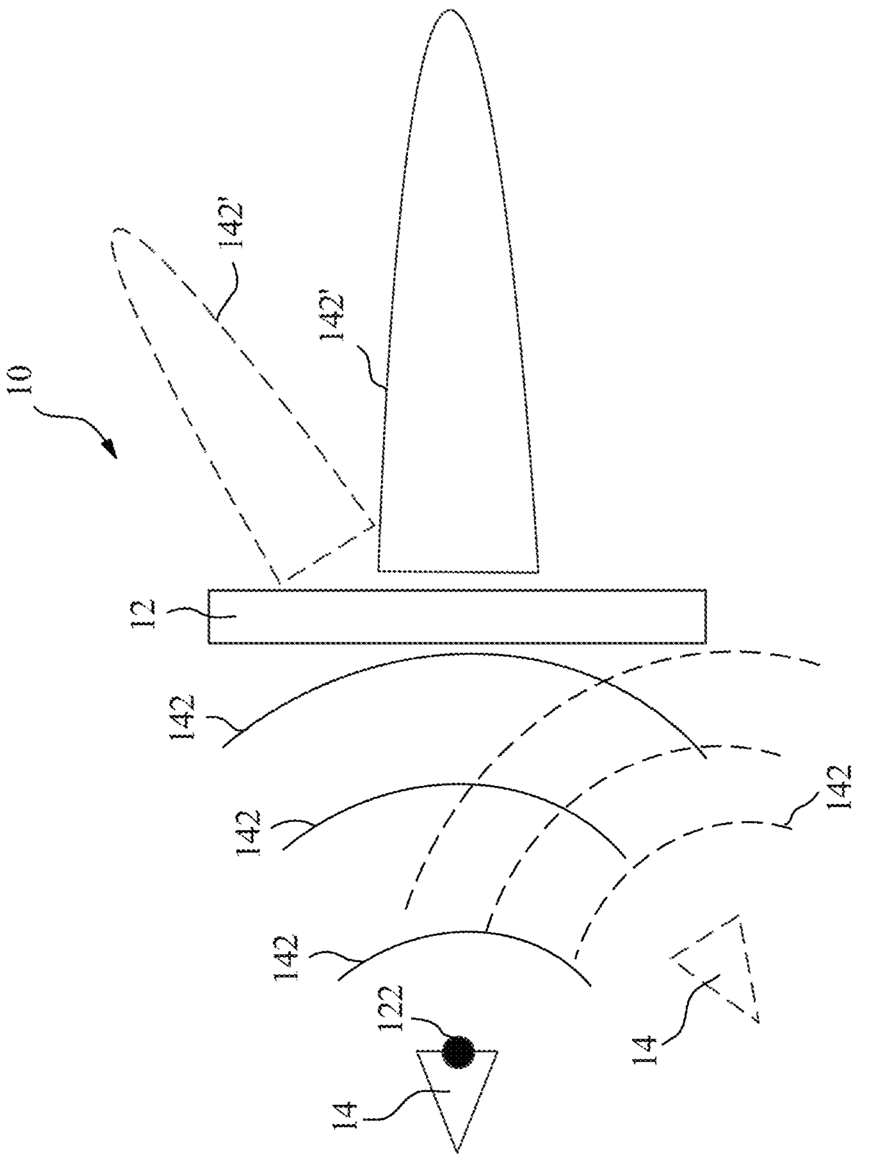
Fig. 1 Prior Art
FIG. 1 shows a conventional antenna device.
Figure 2:
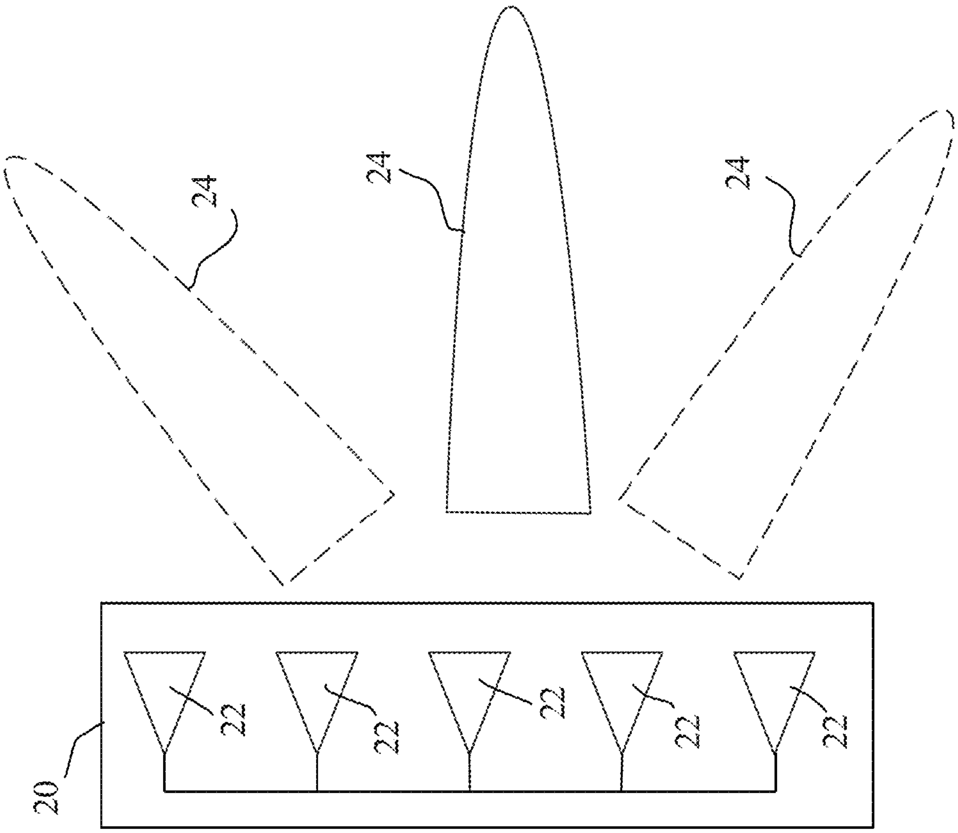
Fig. 2 Prior Art
FIG. 2 shows another conventional antenna device.
Figure 3:
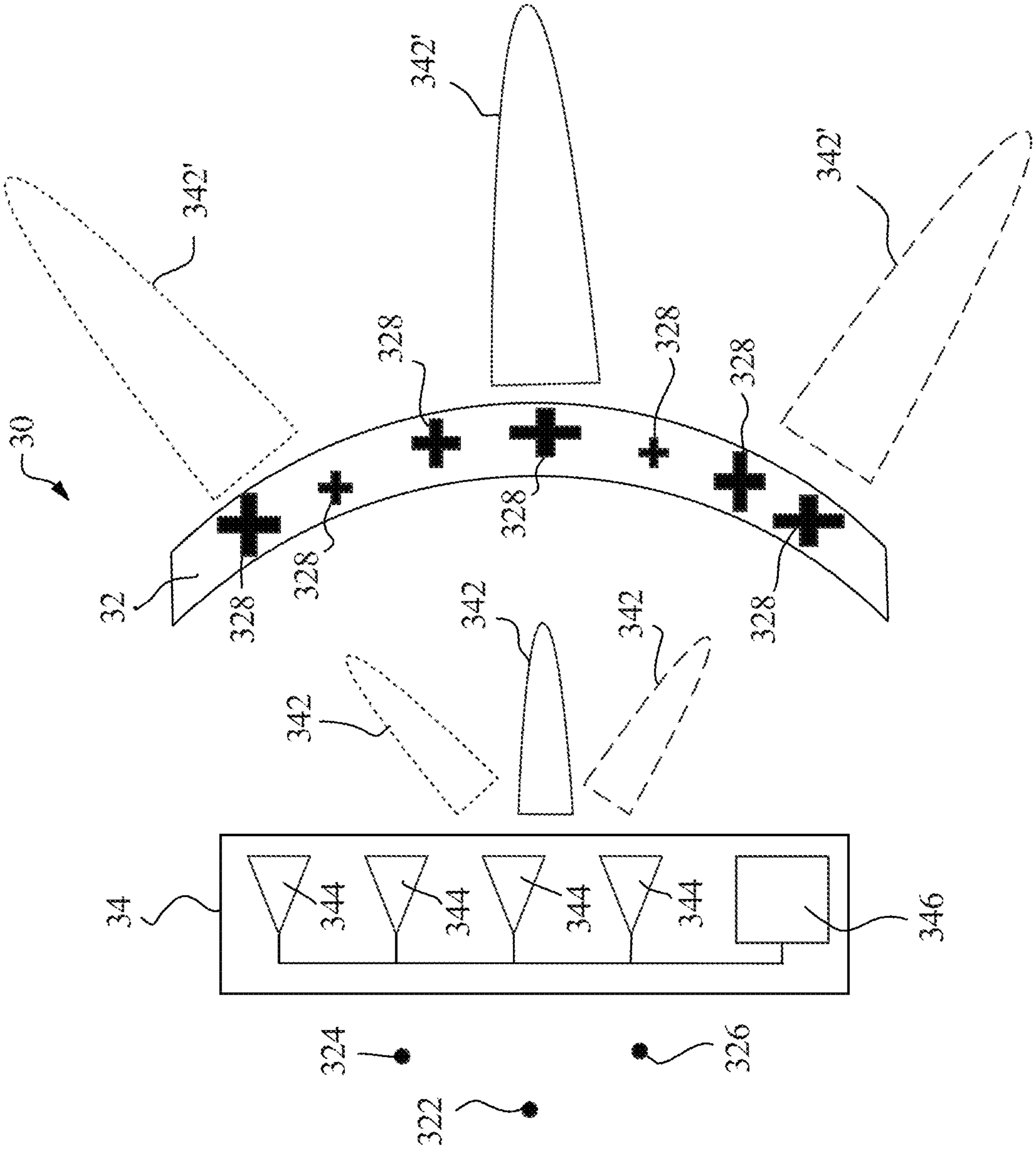
FIG. 3 shows an integrated antenna device according to one embodiment of the present invention.
Figure 4:
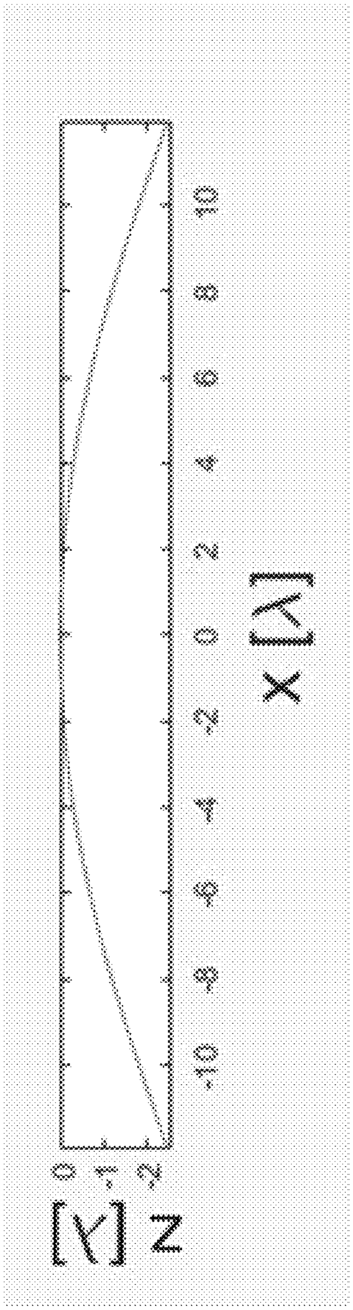
FIG. 4 schematically shows an architecture of a curved-surface transmitting array according to one embodiment of the present invention.

FIG. 3 schematically shows an integrated antenna device 30 according to one embodiment of the present invention. The integrated antenna device 30 comprises a curved-surface transmitting array 32 and a feeder array antenna 34. The curved-surface transmitting array 32 has a plurality of focuses. The feeder array antenna 34 functions as a signal feeding element. In the embodiment shown in FIG. 3, the initial shape of the curved surface of the curved-surface transmitting array 32 may be designed according to the principle of the Rotman lens to determine the inner surface profile of the curved-surface transmitting array. Therefore, the curved-surface transmitting array 32 theoretically has three focuses 322, 324 and 326, which demonstrates the possibility of multiple focuses. For the deduction of the principle of the Rotman lens, please refer to a document in P. 49176-49188, Vol. 9, 2021, Access of IEEE: "*Development of 2-D Generalized Tri-Focal Rotman Lens Beamforming Network to Excite Conformal Phased Arrays of Antennas for General Near/Far-Field Multi Beam Radiations*". FIG. 4 shows a projected surface profile of the curved-surface transmitting allay 32, which is deduced from the equations in the abovementioned document. In the present invention, the curved-surface transmitting array 32 is not limited to having only three focuses; the plurality of focuses of the curved-surface transmitting array 32 is not limited to being positioned on the same tangential surface but may be distributed in 3D space. The plurality of focuses 322, 324, and 326 needs to be appropriately defined so as to achieve a focusing effect. The design of focuses is a mature technology. Therefore, how to appropriately define focuses will not repeat herein. The number of the focuses of the curved-surface transmitting array 32 may be varied according to requirement, which are predefined for later optimization. The shape (such as a plane) of the curved-surface transmitting array 32 may be derived from the abovementioned initial curved surface. The electromagnetic algorithm may be used to optimize the plurality of focuses 322, 324 and 326 and the phase changes of the array units of the curved-surface transmitting array 32.

The feeder array antenna 34 is arranged between the curved-surface transmitting array 32 and the plurality of focuses 322, 324 and 326. The feeder array antenna 34 includes a plurality of feeder antennas 344 in parallel and an active RF (Radio Frequency) module 346. The feeder antennas 344 of the feeder array antenna 34 may be but are not limited to be patch antennas. The layout of the feeder array antenna 34 may be a plane or a curved surface. The active RF module 346 of the feeder array antenna 34 is a control circuit for controlling the feeder antennas 344. The active RF module 346 of the feeder array antenna 34 controls the coefficients of each feeder antenna 344 to generate a first-order beam (radiation waveform) 342 and controls the direction of the first-order beam 342. The first-order bean 342 matches with the phase changes of the array units of the curved-surface transmitting array 32 to generate a focusing action. Through rearranging to generate the beamforming feed excitation weight of the active RF module 346, the first-order beam 342 may match with one of the plurality of focuses 322, 324 and 326, and the curved-surface transmitting array 32 refocuses the first-order beam 342 to make the whole integrated antenna device 30 have a beam scanning function. The beamforming feed excitation weight is used to adjust the phases and amplitudes of signals.

The feeder array antenna 34 generates the first-order beam 342 and performs beam scanning with appropriate amplitudes and phases, which is similar to the conventional array antenna 20 by equal-phase radiation field superpositions. The conventional array antenna uses linear phase change to excite neighboring feeder antennas 344. With the existence of the curved-surface transmitting array 32, the feeder antennas 344 of the present invention generate matching phases to acquire the greatest antenna gain, Which is different from the conventional array antenna. With the existence of the curved-surface transmitting array 32, the first-order beam 342, which is emitted by the feeder array antenna 34, has a virtual focus (not shown in the drawing) corresponding to one of the focuses 322, 324 and 326 of the curved-surface transmitting array 32. It is preferred that the virtual focus of the first-order beam 342 completely coincides with one of the focuses 322, 324 and 326. The curved-surface transmitting array 32 focuses the first-order beam 342 to generate a high-gain second-order beam 342'. For another direction of the beam, the virtual focus thereof appears among the focuses 322, 324 and 326. The practical focusing mechanism is stated as follows: turn on and excite the feeder antennas 344 of the feeder array antenna 34 in sequence to acquire the first-order beam 342; according to the intended direction of the beam, acquire the intensity and phase of the electromagnetic signal of each feeder array antenna 34 in the direction; acquire the excitation weight of the feeder array antenna 34 in the direction using the conjugate calculation of the intensity and phase of the electromagnetic signal; if beam scanning is being performed, change the directions of the selected signals in sequence to update the excitation weight of the array antenna.

The curved-surface transmitting array 32 includes a plurality of array units 328. The plurality of array units 328 has transmitting phases to change the phases of signals. The transmitting phases of the array units 328 are different according to the shapes, strictures and/or sizes of the array units 328. Through appropriately designing the shape and/or size of each array unit 328, the plurality of army units 328 may focus the first-order beam 342 to generate the second beam 342' and determine the gain of the second-order beam 342'. The array units 328 may have regular or irregular shapes. The air ay units 328 may respectively have different shapes, as shown in FIG. 3. In one embodiment, the array units 328 of the curved-surface transmitting array 32 may be realized by multilayer dielectric substrates. However, the present invention is not limited by this embodiment. In another embodiment, the array units 328 of the curved-surface transmitting array 32 may be realized by the wave-guide structures made of a single dielectric layer.

In one embodiment, the Steepest Decent Method (SDM) is used to design the transmitting phase of each array unit 328. For the details of the algorithm, please refer to a document in P. 4008-4016, Vol. 6G, Issue 8, August 2018, Transactions on Antennas and Propagation of IEEE:

"*Synthesis and Characteristic Evaluation of Convex Metallic Reflectarray Antennas to Radiate Relatively Orthogonal Multibeams*". SDM can reduce the difficulty in designing the array unit 328 because it needn't use complicated equations. SDM is one of electromagnetic phase-only synthesis algorithms. The present invention may also use another electromagnetic optimization algorithm that can optimize the transmitting phases of the array units 328.

In one embodiment, it is an ordinary rule to arrange the plurality of array units 328 periodically. In other words, the distances between adjacent array units are identical. However, a non-periodic optimal arrangement, such as a hexagonal arrangement, may also be used without departing from the spirit of the present invention.

In one embodiment, the array units 328 in FIG. 3 may be formed by a metamaterial. However, the present invention is not limited by the embodiment. In the present invention, any material that can change the phases of signals may be used to construct the array units 328.

In the integrated antenna device 30 of the present invention, the feeder array antenna 34 is used to generate the first-order beam 342 and implement beam scanning. In order to enhance the gain of the beam, the integrated antenna device 30 of the present invention uses the curved-surface transmitting array 32 to focus the first-order beam 342 and generate the high-gain second-order beam 342'. The second-order beam is a radiation beam representing the integrated antenna device 30. The characteristics of the second-order beam may be used to establish specifications of practical communication systems and applied to operations of practical communication systems. For a given gain, the feeder array antenna 34 of the present invention has smaller size, fewer feeder antennas and lower power consumption than the conventional array antenna 20 because of the high antenna gain production. In comparison with the conventional antenna device 10, the curved-surface transmitting array 32 of the present invention has a plurality of focuses. Therefore, the second-order beams 342' respectively having different directions may have more consistent gains during beam scanning. This decreases scanning loss. The feeder array antenna 34 (the signal feeding element) of the present invention is disposed between the curved-surface transmitting array 32 and the focuses 322, 324 and 326. Therefore, the height/thickness of the integrated antenna device 30 of the present invention is smaller than a half of the height/thickness of the conventional antenna device 10.

Figure 6:
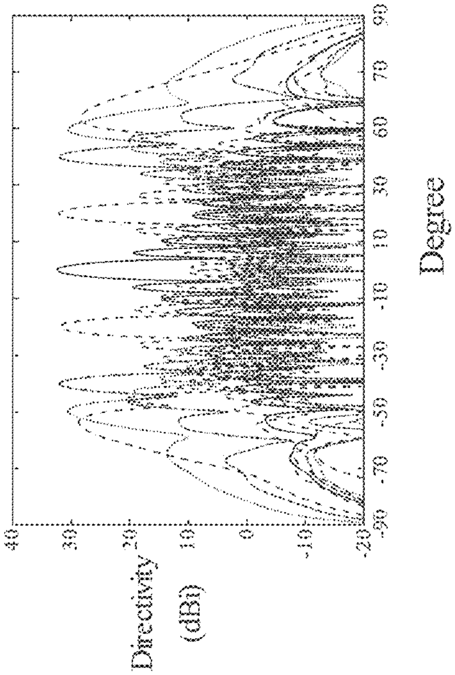
FIG. 6 shows the gains of the curved-surface transmitting array of the present invention at different angles according to one embodiment of the present invention.
Figure 5:
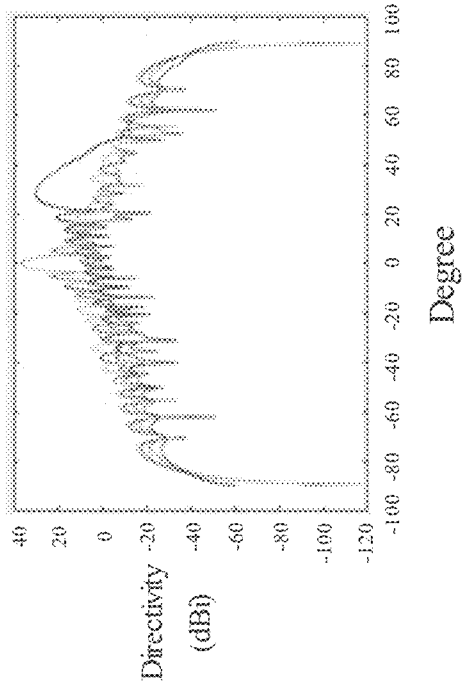
Fig. 5 Prior Art
FIG. 5 shows the gains of a conventional planar transmitting array at different angles.

FIG. 5 shows the gains of the conventional planar transmitting array 12 at different angles. FIG. 6 shows the gains of the curved-surface transmitting array 32 of the present invention at different angles. It can be seen in FIG. 5 and FIG. 6: the curved-surface transmitting array 32 has more uniform gain in the range of 0-50 degrees. In other words, the beam of the curved-surface transmitting array 32 has good gains in a plurality of directions.

Figure 7:
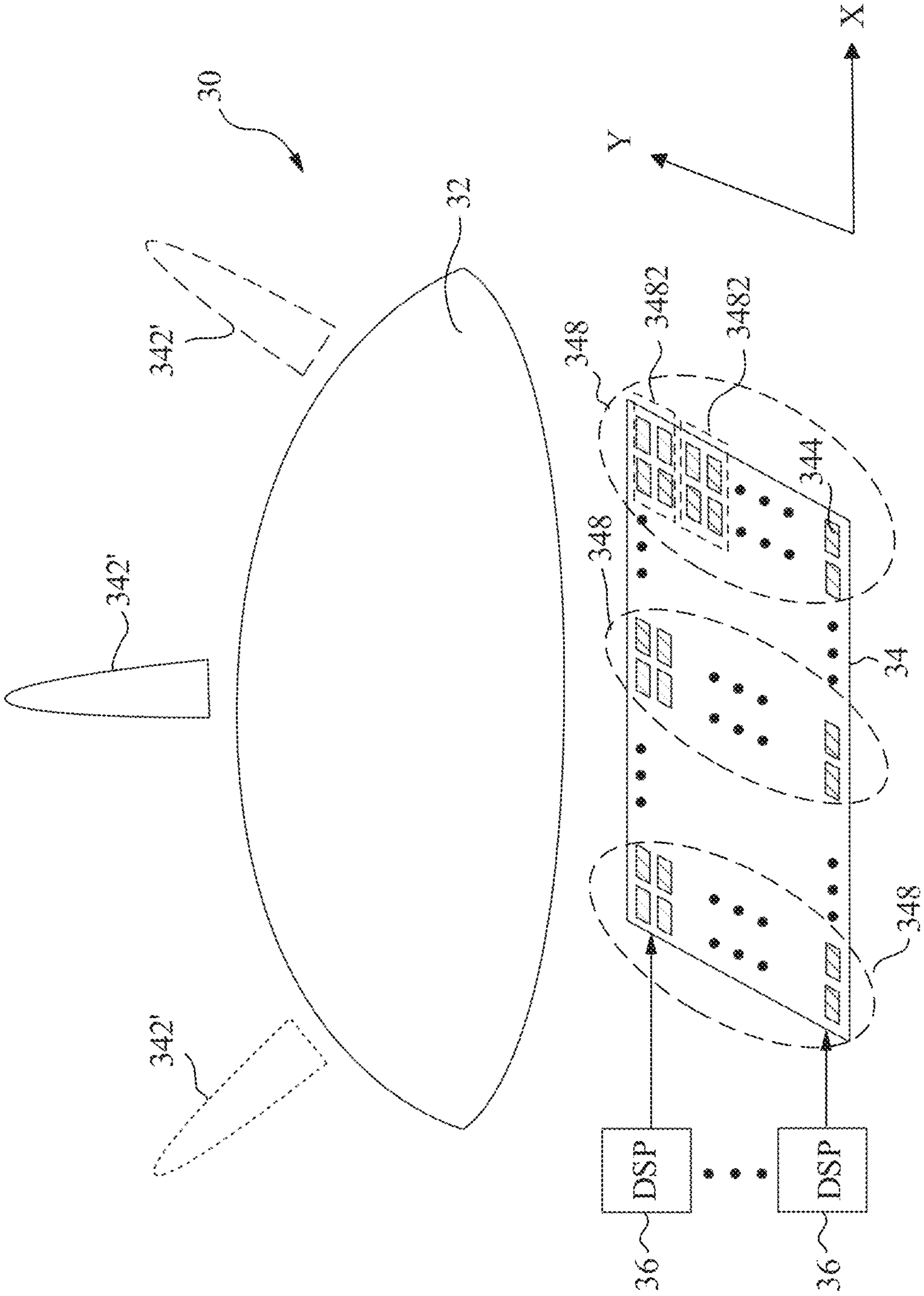
FIG. 7 schematically shows a beam scanning operation of the integrated antenna device 30 in FIG. 3.

FIG. 7 schematically shows a beam scanning operation of the integrated antenna device 30 in FIG. 3. The feeder array antenna 34 is partitioned into a plurality of subarrays 3482, where each subarray 3482 is excited by a plurality of active RF modules 346 (not shown in FIG. 7) to produce excitation amplitudes and phases of the first-order beam 342. In FIG. 7, Each subarray 3482 has four feeder antennas 344, but the present invention is not limited thereto. The plurality of subarrays 3482 are partitioned into a plurality of groups 348 through a plurality of DSP processors 36, where the plurality of groups 348 can produce the first-order beam 342 (not shown in FIG. 7). For example, when the receiving device (not shown in FIG. 7) is located on the far left side of the integrated antenna device 30, the group 348 at the rightmost of the feeder array antenna 34 emits a first-order beam 342 to the left of the curved-surface transmitting array 32 to produce a second-order beam 342' in the left side of FIG. 7. When the receiving device is located directly above the integrated antenna device 30, the group 348 located in the middle of the feeder array antenna 34 emits a first-order beam 342 above the curved-surface transmitting array 32 to generate a second-order beam 342' in the middle of FIG. 7. When the receiving device is located on the far right side of the integrated antenna device 30, the group 348 at the leftmost of the feeder army antenna 34 emits a first-order beam 342 to produce a second-order beam 342' in the right side of FIG. 7. As the position of the receiving device changes, the integrated antenna device controls different groups 348 to emit a first-order beam 342 to generate a second-order beam 342' corresponding to the position of the receiving device.

In one embodiment, at least two groups 348 can simultaneously produce at least two first-order beams 342 in different directions.

In one embodiment, DSP processors 36 may dynamically adjust the group 348 in real time according to the position of the receiving device. For example, in FIG. 7, the DSP processors 36 use a plurality of subarrays 3482 in the Y direction to form a group 348, but when the position of the receiving device changes, the DSP processors 36 may use a plurality of subarrays 3482 in the X direction to form a group.

The feeder array antenna 34 of the present invention can be used as a single-army standing-alone. The feeder array antenna 34 may also be partitioned into a plurality of groups 348 which are operating independently, therefore the present invention does not need to change the focusing behaviors of the curved-surface transmitting array 32 for multi-beam production.

Figure 8:
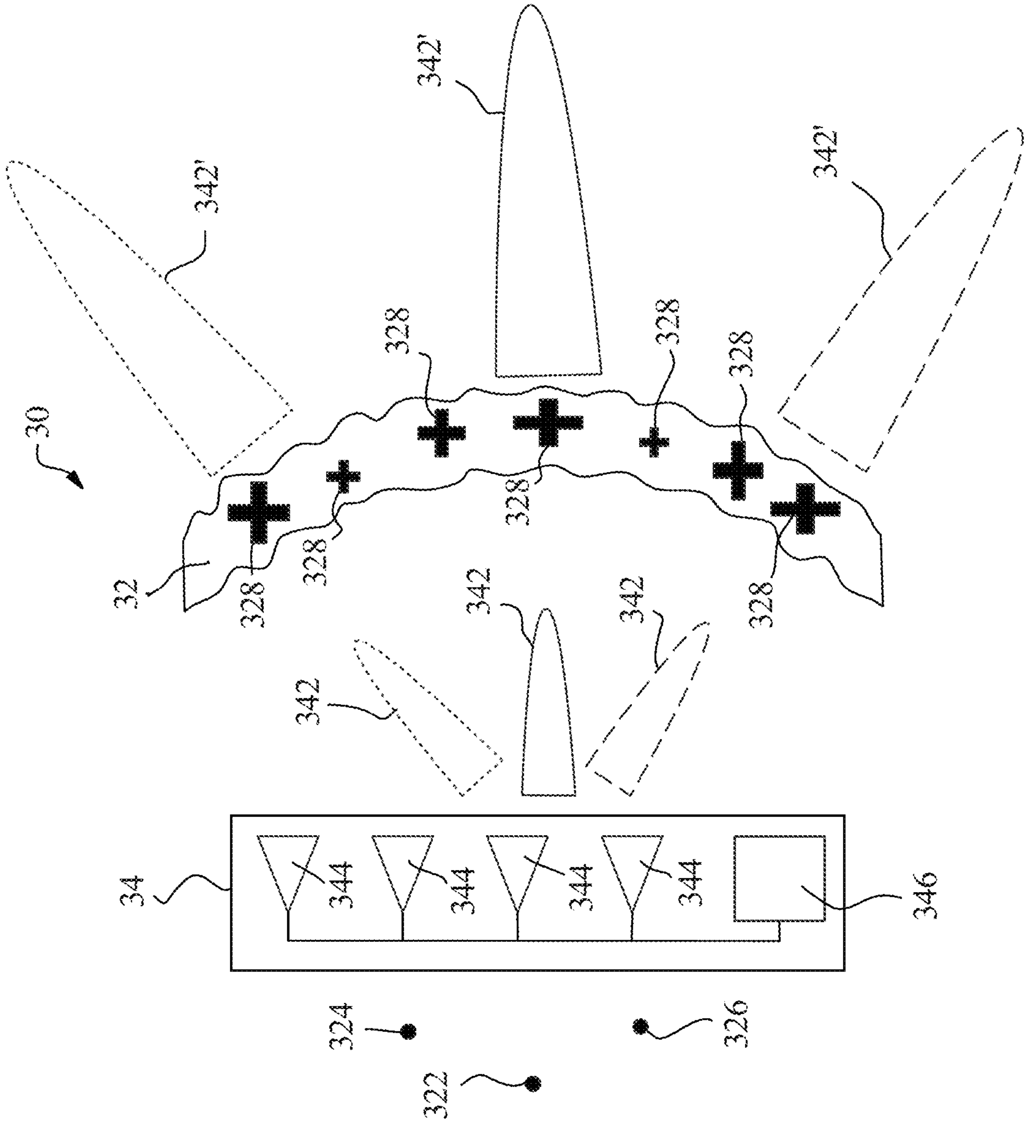
FIG. 8 schematically shows another embodiment of the curved-surface transmitting array 32 in FIG. 3.

In FIG. 3, the curved-surface transmitting array 32 has a uniform thickness, but the present invention is not limited thereto. FIG. 8 schematically shows another embodiment of the curved-surface transmitting array 32 in FIG. 3. In FIG. 8, the curved-surface transmitting array 32 has an uneven thickness, with the thickness of the curved-surface transmitting army 32 is different, the caused phase change when the first-order beam 342 through the curved-surface transmitting array 32 will also be different. Thus by properly designing the thickness of each position of the curved-surface transmitting array 32, the phase of the signal through the curved-surface transmitting array 32 may be adjusted, and then adjust the gain of the second-order beam 342'.

Figure 9:
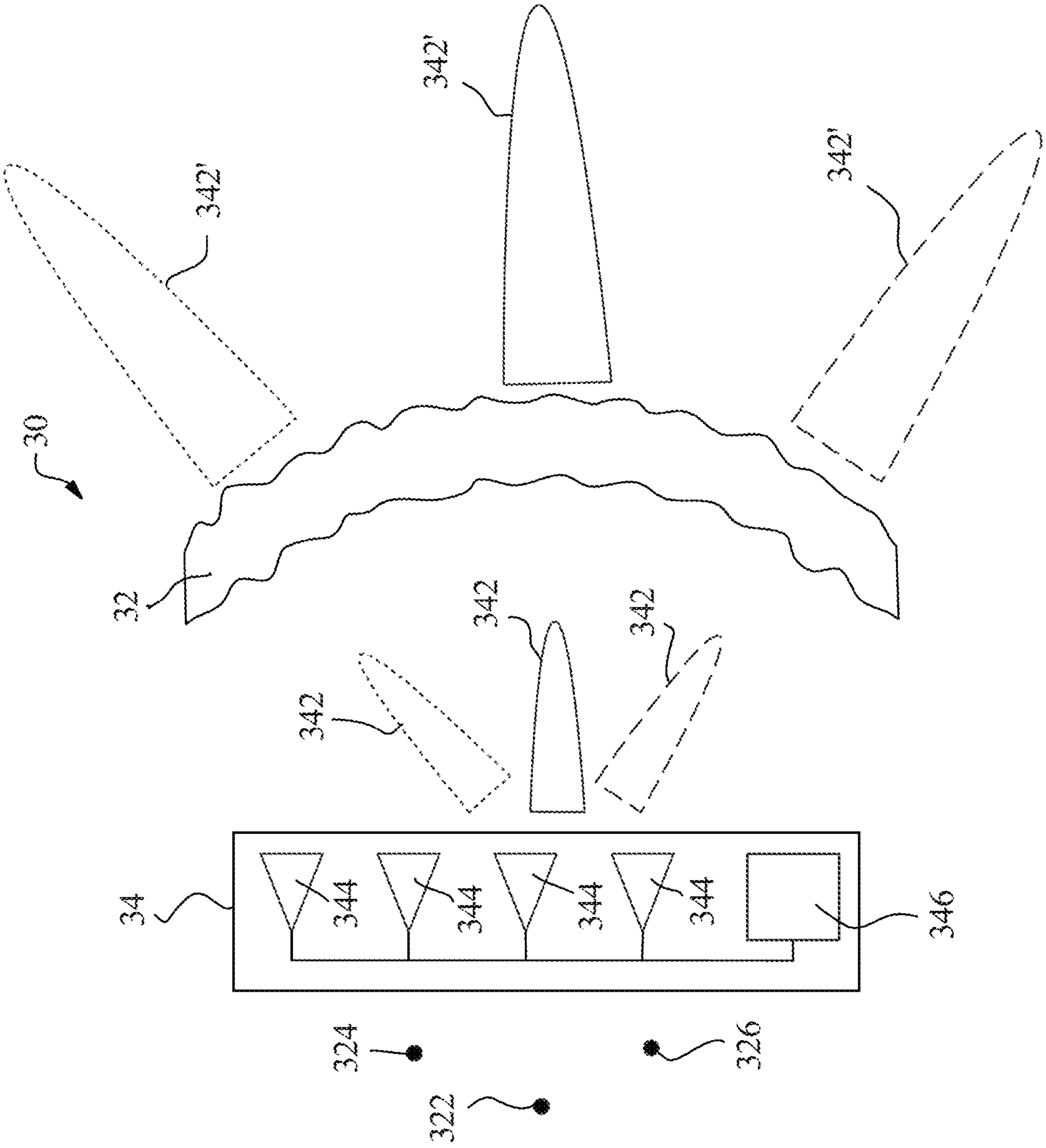
FIG. 9 schematically shows further embodiment of the curved-surface transmitting array 32 in FIG. 3.

FIG. 9 schematically shows further embodiment of the curved-surface transmitting array 32 in FIG. 3. In FIG. 9, the curved-surface transmitting array 32 has an uneven thickness, and the array units 328 are omitted. The curved-surface transmitting array 32 of FIG. 9 using uneven thickness to adjust the phase of the signal through the curved-surface transmitting array 32, and then adjust the gain of the second-order beam 342'.

The present invention has been disclosed with embodiments hereinbefore. However, the embodiments described above are only to exemplify the present invention but not to limit the scope of the present invention. According to the technical contents disclosed above, the persons skilled in the art should be able to make equivalent modifications or variations without departing from the present invention. Therefore, any equivalent modification or variation made by the persons skilled in the art according to the technical contents of the present invention is to be also included by the scope of the present invention.

What is claimed is:

1. An integrated antenna device, comprising:

a feeder array antenna, configured to emit a first-order beam and control a direction of the first-order beam, the first-order beam having a virtual focus; and a curved-surface transmitting array, having a plurality of focuses, configured to focus the first-order beam to generate a second-order beam, and including a plurality of array units configured to vary phases of signals and determine a gain of the second-order beam, wherein the feeder array antenna is arranged between the curved-surface transmitting array and the plurality of focuses, such that, when the feeder array antenna selectively controls the first-order beam to coincide the virtual focus of the first-order beam with any one of the plurality of focuses of the curved-surface transmitting array, the curved-surface transmitting array focuses the first-order beam to increase the gain of the second-order beam, and wherein the feeder array antenna is configured to selectively control the phase of the first-order beam to be matched to any one of the plurality of focuses, such that the curved-surface transmitting array refocuses the first-order beam to enable a beam scanning function.

2. The integrated antenna device according to claim 1, wherein the feeder array antenna includes a plurality of feeder antennas in parallel, and is excited by a plurality of Radio Frequency (RF) modules to produce amplitudes and phases of the first-order beam.

3. The integrated antenna device according to claim 1, wherein the feeder array antenna consists of a plurality of subarrays which are excited by a plurality of active Radio Frequency (RF) modules and processed by digital signal processing (DSP) processors, wherein the plurality of subarrays are partitioned into a plurality of groups through the DSP processors, where the plurality of groups can produce the first-order beam.

4. The integrated antenna device according to claim 1, wherein material of the plurality of array units includes a metamaterial.

5. The integrated antenna device according to claim 1, wherein a Steepest Decent Method (SDM) is used to design a transmitting phase of each array unit.

6. The integrated antenna device according to claim 1, wherein the curved-surface transmitting array is designed according to the principle of the Rotman lens.

7. The integrated antenna device according to claim 1, wherein the curved-surface transmitting array has an uneven thickness for varying the phases of the signals and determining the gain of the second-order beam.

8. An integrated antenna device, comprising:

a feeder array antenna, configured to emit a first-order beam and control a direction of the first-order beam, the first-order beam having a virtual focus; and a curved-surface transmitting array, having a plurality of focuses and an uneven thickness, configured to focus the first-order beam to generate a second-order beam, wherein the uneven thickness of the curved-surface transmitting array is used to vary phases of signals and determine a gain of the second-order beam, wherein the feeder array antenna is arranged between the curved-surface transmitting array and the plurality of focuses, such that, when the feeder array antenna selectively controls the first-order beam to coincide the virtual focus of the first-order beam with any one of the plurality of focuses of the curved-surface transmitting array, the curved-surface transmitting array focuses the first-order beam to increase the gain of the second-order beam, and wherein the feeder array antenna is configured to selectively control the phase of the first-order beam to be matched to any one of the plurality of focuses, such that the curved-surface transmitting array refocuses the first-order beam to enable a beam scanning function.

9. The integrated antenna device according to claim 8, wherein the feeder array antenna comprises a plurality of feeder antennas in parallel, and is excited by a plurality of Radio Frequency (RF) modules to produce amplitudes and phases of the first-order beam.

10. The integrated antenna device according to claim 8, wherein the curved-surface transmitting array is designed according to the principle of the Rotman lens.

* * * * *